United States Patent
Seki

[11] Patent Number: 6,033,759
[45] Date of Patent: Mar. 7, 2000

[54] MAGNETIC RECORDING MEDIUM

[75] Inventor: Keiichi Seki, Yokohama, Japan

[73] Assignee: Verbatim Corporation, Charlotte, N.C.

[21] Appl. No.: 08/963,757

[22] Filed: Nov. 4, 1997

[51] Int. Cl.$^7$ .................................................. G11B 5/68
[52] U.S. Cl. ................. 428/141; 428/328; 428/694 BB; 428/900
[58] Field of Search ..................... 428/141, 328, 428/694 BB, 900

[56] References Cited

U.S. PATENT DOCUMENTS

| | | | |
|---|---|---|---|
| 5,202,810 | 4/1993 | Nakamura et al. | 360/135 |
| 5,607,747 | 3/1997 | Law et al. | 428/141 |
| 5,737,229 | 4/1998 | Bhushan | 364/468.24 |
| 5,820,969 | 10/1998 | Satoh | 428/141 |

*Primary Examiner*—Stevan A. Resan
*Attorney, Agent, or Firm*—Oblon, Spivak, McClelland, Maier & Neustadt, P.C.

[57] ABSTRACT

A tape-shaped magnetic recording medium for executing recording/reproducing processes at a running speed 2m/sec or higher is capable of exhibiting an excellent running characteristic and making it hard to cause print-through as well. This magnetic recording medium comprises a non-magnetic support, a magnetic layer formed on one surface of the non-magnetic support body and containing at least ferromagnetic metal powders and binding agent resin, and a backing layer formed on an opposite surface thereof and containing at least a carbon black and the binding agent resin. In this magnetic recording medium, a three-dimensional root mean square value roughness Rq of the surface of the backing layer is 200 nm or above through 280 nm or under, and a three-dimensional distortion degree Rsk of the surface thereof is −0.2 or under:

$$Rq = \left[\frac{1}{S}\int \{f(x,y)\}^2 ds\right]^{1/2} \quad \text{Formula[1]}$$

$$Rsk = \frac{S^{1/2} \cdot \int \{f(x,y)\}^3 ds}{[\int \{f(x,y)\}^2 ds]^{3/2}} \quad \text{Formula[2]}$$

where f(x, y) is the roughness surface expressed on the unit of nm on the definition that an X-Y plane is the roughness mean surface, a recessed portion is negative and a protruded portion is positive, and S represents an area of a roughness measurement area on the X-Y plane.

3 Claims, 1 Drawing Sheet

$Rsk = 0$ $Rsk < 0$ $Rsk > 0$

MAGNETIC RECORDING MEDIUM

BACKGROUND OF THE INVENTION

1. Field of the Invention

The present invention relates generally to a magnetic recording medium and more particularly to a tape-shaped magnetic recording medium including a backing layer, for executing recording/reproducing processes while being run at a high velocity.

2. Related Background Arts

In recent years, with a remarkable enhancement of information processing capability of a computer, a magnetic recording medium is increasingly required to have a much higher density and a much higher reliability. Therefore, for example, concerning a magnetic layer, there has been developed, as a layer suitable for a high-density record, a coated magnetic layer using a fine ferromagnetic metal powder having a specific area of 50 m$^2$/g or above and a coercive force of 1500 [Oe] or above, which layer has become available in recent years. The high-performance magnetic layer like this is expected to suit with the high-density record having a record wavelength of 0.5 µm or under. Thus, even slight ruggedness or ununiformity on the surface of the magnetic layer of such a degree that there must be no problem in terms of utility when the record wavelength is large, might cause a decrease in output and/or an increase in noises, and then an occurrence of a drop-out. Hence, there have been made endeavors of drawing out the performance of the fine ferromagnetic metal powder to the utmost by obtaining more enhanced smoothness of the magnetic layer than ever before.

On the other hand, a size of the data to be dealt with becomes large, and a time necessary for the record and reproduction also increases corresponding thereto. It is also increasingly required to reduce this time. As one of approaches to this, it tends that a relative velocity between the magnetic head and the magnetic recording medium becomes higher and higher. In the case of the reproduction by a ring head, a reproduced output becomes larger as the relative velocity between the magnetic head and the magnetic recording medium increases, and hence the speed-up is desired in order to improve a magneto-electric transduction characteristic. With respect to a belt driven magnetic recording tape cartridge as disclosed in, e.g., U.S. Pat. No. 3,692,255, a product thereof is utilized, wherein the magnetic tape runs at a high speed, approximately 2 m/sec, between two tape reels.

When the tape is wound up at such a high speed, it might happen that the air is drawn between layers of the tape, resulting in slackened windings of the tape. In a worse case, a winding deviation might occur. There is known a technique for avoiding that deviation, wherein the windings are ensured by leaking the air drawn between the layers of the tape from gaps formed rugged portions on the surface of the backing layer, which surface is intentionally roughened.

Incidentally, the magnetic layer with its surface smoothed and the backing layer with its surface roughened, are adjacent to each other when the magnetic tape is wound. Thus, it might happen that a surface characteristic of the magnetic layer declines because of the ruggedness on the backing layer being transferred onto the surface of the magnetic layer. This phenomenon is called print-through. A problem of this print-through arises in the magnetic layer corresponding to a high record density using fine ferromagnetic metal powders. Besides, in the above-described belt driven magnetic record tape cartridge, the wound magnetic layer and the backing layer are pressed against each other by a strong force in which the pressing force due to a tension of the drive belt is added to a winding tension, and therefore the print-through in particular comes into the problem.

A reduction in the ruggedness on the backing layer is effective in avoiding the print-through but is undesirable because of worsening the running and winding characteristics. In this respect, there has been given so far no definite solution of how the surface of the backing layer usable for the high-density magnetic tape having a recording wavelength of, e.g., 0.5 µm or under should be designed.

SUMMARY OF THE INVENTION

It is a primary object of the present invention to provide a magnetic recording medium suitable for a high-density record and capable of exhibiting both of a good magneto-electric transduction characteristic and a good running characteristic.

The present inventors, as a result of having made examinations in concentration to obtain a magnetic recording medium well-balanced between the magneto-electric transduction characteristic and the running characteristic, found out that the problems described above can be obviated when a backing layer has a specific surface configuration parameter, and came to a completion of the present invention.

To accomplish the above object, according to one aspect of the present invention, a tape-shaped magnetic recording medium for executing recording/reproducing processes at a running speed 2 m/sec or higher comprises a non-magnetic support, a magnetic layer formed on one surface of the non-magnetic support and containing at least ferromagnetic metal powders and binding agent resin, and a backing layer formed on an opposite surface thereof and containing at least carbon black and binding agent resin. In this magnetic recording medium, a three-dimensional root mean square value roughness Rq of the surface of the backing layer is 200 nm or above through 280 nm or under, and a three-dimensional distortion degree Rsk of the surface thereof is −0.2 or under.

BRIEF DESCRIPTION OF THE DRAWING

Other objects and advantages of the present invention will become apparent during the following discussion in conjunction with the accompanying drawings, in which.

DESCRIPTION OF THE PREFERRED EMBODIMENT

The present invention will hereinafter be described in detail.

There has hitherto been made discussions on a root-mean square value roughness Rq conceived as one of indexes representing a ruggedness on the surface of a backing layer and defined by the following formula [1] in order to obtain the backing layer causing a small amount of print-through onto a magnetic layer and, besides, exhibiting excellent running and winding characteristics in a magnetic recording medium as constructed to record and reproduce at a high speed involving a running velocity of 2 m/second or higher.

$$Rq = \left[\frac{1}{S}\int \{f(x, y)\}^2 ds\right]^{1/2} \quad \text{Formula[1]}$$

where f(x, y) is the roughness surface expressed on the unit of nm on the assumption that an X-Y plane is the roughness mean surface, a recessed portion is negative, and a protruded portion is positive, and S represents an area of a roughness measurement area on the X-Y plane.

This surface parameter Rq is, as will be obvious from this definition, treated as a parameter in which the recessed and protruded portions on the surface are equal.

The present inventors, as a result of having examining the surface configuration on the backing layer in greater detail, acquired the following knowledge. The following is an explanation which will be made with reference to the drawings.

Figure 1A:
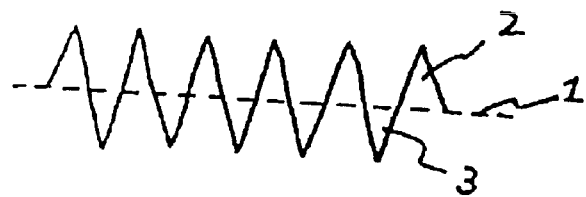
FIGS. 1(a), 1(b) and 1(c) are schematic diagrams each showing a two-dimensional section of a surface configuration of a backing layer.
Figure 1B:
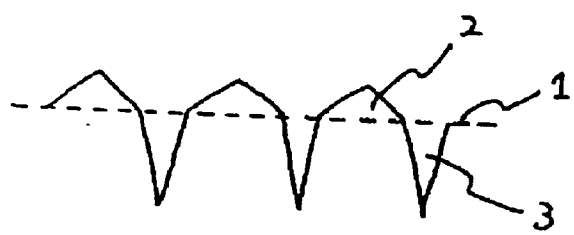
Figure 1C:
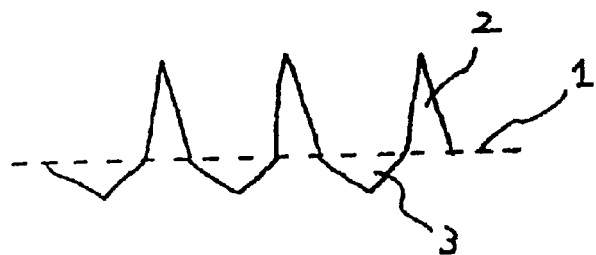

FIGS. 1(a), 1(b) and 1(c) are schematic diagrams each showing a two-dimensional section of the surface configuration of the backing layer. An upper portion is a protruded portion 2, while a lower portion is a recessed portion 3 on the basis of a central line 1. Sectional areas (of the portions sectioned by the central line 1) of the respective protruded portions 2 and of the recessed portions 3, are equal in FIGS. 1(a), 1(b) and 1(c). The normal backing layer assumes a configuration as shown in FIG. 1(a). Namely, a depth of the recessed portion and a height of the protruded portion are, as viewed based on the central line 1, substantially equal. With respect to a symmetry between the protruded portion 2 and the recessed portion 3, however, other types of surface configurations can also be considered. There may be considered, for example, a type of having a deep and sharp recessed portion 3 and a low and gentle protruded portion 2 as illustrated in FIG. 1(b), and a type of having a shallow and gentle recessed portion 3 and a high and sharp protruded portion 2 as show in FIG. 1(c). A surface roughness parameter Rsk designed by the following formula [2] is known as an appropriate parameter for distinguishing between these three types.

$$Rsk = \frac{S^{1/2} \cdot \int \{f(x, y)\}^3 ds}{[\int \{f(x, y)\}^2 ds]^{3/2}} \quad \text{Formula[2]}$$

where f(x, y) is the roughness surface expressed on the unit of nm on the assumption that an X-Y plane is the roughness mean surface, a recessed portion is negative and a protruded portion is positive, and S represents an area of a roughness measurement area on the X-Y plane.

In fact, Rsk is drawn out by the next formula [3] after measuring a three-dimensional configuration of the target surface and obtaining a height Yi at each measurement point i.

$$Rsk = \frac{1}{n \cdot (Rq)^3} \sum_{i=1}^{n} (Yi)^3 \quad \text{Formula[3]}$$

where Yi is the height expressed as a distance from the roughness mean surface at each point on the unit nm on the definition that the recessed portion is negative while the protruded portion is positive, Rq is the root mean square value roughness, and n is the number of pieces of measurement data.

Thus surface characteristic parameter Rsk becomes such as Rsk=0 if the recessed portion 3 and the protruded portion 2 take a symmetrical configuration as shown in FIG. 1(a). If the depth of the recessed portion is larger the height of the protruded portion as shown in FIG. 1(b), however, this parameter becomes such as Rsk<0, and an absolute value thereof becomes larger with the smaller height of the protruded portion and a larger depth of the recessed portion. Reversely, as shown in FIG. 1(c), the parameter become such as Rsk>0 if the height the protruded portion is larger than the depth of the recessed portion. The absolute value thereof becomes larger with a smaller depth of the recessed portion and a larger height of the protruded portion.

When evaluating a performance of the backing layer with this surface characteristic parameter Rsk as an index together with Rq which has mainly been examined, it proved that the running characteristic and a difficulty of causing the print-through are compatible on condition that Rq falls within a specific range, Rsk is negative, and the absolute value thereof is sufficiently large.

That is to say, if the recessed portion is sufficiently deep, the air drawn in between layers of the tape easily leaks out of troughs even when the protruded portions are not comparatively high, and hence there might be no possibility of causing winding deviations and slackening the tape. On the other hand, the occurrence of the print-through is also restrained by decreasing the height of the protruded portion.

According to the present invention, the three-dimensional root mean square value roughness Rq of the backing layer should fall with a range of 200 nm or above through 280 nm or under. In the case of the smooth backing layer with Rq being less than 200 nm, if winding and rewinding processes are repeated at a speed as high as 2 m/sec or above, the winding deviations occurs by air drawn between the tape layers. On the other hand, if Rq is 280 nm or above, the protruded portions are too large, and hence a pressed mark is to be transferred onto the adjacent magnetic layer, which might be a cause of drop-out.

The present invention is further characterized in that Rsk is smaller than −0.2. If Rsk is larger than −0.2, as discussed above, there increases a ratio of the protruded portions in terms of the surface configuration, and therefore the protruded portions are pressed when being contiguous to the magnetic layer, which might deform the magnetic layer as well as being the cause of the drop-out.

To change the backing layer of the surface configuration shown in FIG. 1(a) for that shown in FIG. 1(b), there may be taken a method such as collapsing the protruded portions by executing a calender treatment on the backing layer or scraping off the protruded portions by executing a burnishing treatment.

In order to make Rsk smaller than −0.2 by, e.g., the calender treatment, it is a general practice that the calender treatment is done under such a condition that a temperature is low, and a linear pressure is high. The low temperature implies a temperature lower than a glass transition point Tg of binding agent resin. A degree of softening is small at the temperature lower than Tg, and the recessed portions are left, which leads to such a tendency that the winding characteristic is improved.

Whereas if higher than Tg, the backing layer is softened, and, when executing the calender treatment thereon, although the protruded portions are easy to be collapsed, at the same time, the recessed portions are easy to be flattened. Accordingly, in strictly saying, the calender temperature may be appropriately set depending on a composition of the backing layer. When the protruded portion is too large, Rq and Rsk can fall within appropriate ranges by effecting the calender treatment at the high temperature.

It is effective in terms of reducing Rsk for the calender linear pressure to be higher as far as the apparatus permits. The calender linear pressure is preferably 50–300 kg/cm and more preferably 200–300 kg/cm. If a calender constructed to sandwich the material between metal rolls is employed instead of a normally used calender constructed to sandwich the material between the metal roll and an elastic roll, it is preferably possible to obtain a linear pressure as high as 300–400 kg/cm. An optimum range of the calender linear pressure is, however, different depending on a relationship between the calender temperature and the composition of the backing layer, and therefore the calender linear pressure may be properly set depending on the circumstances.

The backing layer according to the present invention is composed principally of at least carbon black and a binding agent resin.

All the carbon blacks which have hitherto been used are applicable as the carbon black to be used for this backing layer. In order to actualize the comparatively rough surface characteristic as the present invention, however, it is preferable to use at least any one of comparatively large particle size carbon black having an average particle size of 70–110 nm and an oil absorption of 60–120 ml (DBP)/100 g, and comparatively high structure carbon black having an average particle size of 10–40 nm and an oil absorption of 200–600 ml (DBP)/100 g.

All the binding agents which have hitherto been known are applicable as the binding agent to be used for this backing layer. The known binding agents are thermoplastic resin e.g., polyvinyl chloride resin such as vinyl chloride-acrylonitrile copolymer, vinyl chloride-vinyl acetate copolymer and vinyl chloride-vinyl acetate-vinyl alcohol copolymer, polyurethane resin such as polyether polyurethane, polyester polyurethane and polycarbonate polyurethane, cellulose resin such as nitrocellulose and cellulose diacetate, and polyester resin. Other known binding agents are thermosetting resins such as phenol resin, epoxy resin and acrylic series reactive resin. Mixtures thereof may also be applicable as the binding agents. A preferable series among those given above is a resin series composed mainly of thermoplastic polyurethane, of which the backing layer exhibiting an excellent abrasion resistance can be formed.

Moreover, the abrasion resistance of the backing layer can be further increased by producing three-dimensional structure, which entails mixing a polyisocyanate series curing agent together with the binding agent resin.

A ratio of the binding agent resin to the carbon black is preferably 40:60–70:30. If a quantity of the binding agent is larger than these ratios, a plastic deformation occurs when sliding on guide pins within the cartridge, with the result that a running friction tends to increase. Further, if a quantity of addition of the carbon black is too large, the powder is easy to separate off due to a lack of the binding agent resin for binding the carbon black, which might conduces to a possibility of causing an error.

Non-magnetic powders other than the carbon black can be added to the backing layer according to the present invention.

The usable non-magnetic powders may be inorganic powders such as silica, alumina, titanium oxide, calcium carbonate, barium carbonate, calcium sulfate, barium sulfate, chromium oxide and α-ferrite, and organic powders such as acrylic styrene resin, benzoguanamine resin and melamine resin. Mechanical physical properties such as a Young's modulus, a conductivity and a surface configuration of the backing layer can be optimized by appropriately combining the carbon black with the above non-magnetic powders.

Among the above non-magnetic powders, the powders having a Moh's hardness of 6 or above such as alumina, chromium oxide and α-ferrite work as abrasive and are effective in enhancing the abrasion resistance of the backing layer. If the additional quantity is excessive, the magnetic layer adjacent when being wound up might be damaged, and therefore the additional quantity is preferably 5.0% or less by weight with respect to the carbon black.

Further, lubricant may be added to the backing layer. The lubricant may include saturated or unsaturated fatty acid and salt thereof, fatty acid amide, fatty acid ester, fatty alcohol, fatty amine, paraffin, denatured or native silicon oil, animal/vegetable oil, mineral oil, perfluoro polyester and perfluoro hydrocarbon. An additional quantity of the lubricant is preferably 0.5%–3.0% by weight with respect to a total weight of the backing layer. If less than 0.5% by weight, no effect can be seen in the lubricant. Whereas if larger than 3.0% by weight, the lubricant excessively permeates the surface of the backing layer, and hence, when a magnetic tape is wound about the reel, the lubricant is transferred onto the magnetic layer, with the result that the excessive lubricant is scattered in spots on the magnetic layer. This might tend to cause a contamination of the head and the drop-out.

As dispersant used for the backing layer according to the present invention, there can be used a known surface activator such as lecithin and phosphate ester, or high polymer dispersant having a polar functional group (e.g., —COOM, —$SO_3M$, —$OSO_3M$, —$PO_3M$, —$OPO_3M$ (where M is hydrogen or alkali metal), or —$NR_1R_2R_3X$ (where $R_1R_2R_3$ is hydrogen or alkyl group, and X is halogen)).

Further, as the solvent used for forming the backing layer of the present invention, there may be given hitherto-used organic solvents such as methylethylketone, methylisobutylketone, cyclohexanone, ethyl acetate, butyl acetate, dioxane, tetrahydrofuran and toluene. The raw materials described above are transformed into paints by hitherto broadly used dispersing machines such as a twin-roll mill, a triple roll mill, an open kneader, a consecutive kneader, a pressurizing kneader, a ball mill, a sand grinder mill, a co-ball mill, a high-speed emperor dispersing machine, a high-speed impact mill, disperser, a high-speed mixer and an ultrasonic disperser. The paint is coated on a non-magnetic support by a known proper method such as a gravure coater, a reverse coater, an extrusion coater and a die coater.

As the non-magnetic support, there may be given, e.g., polyester such as polyethylene terephthalate, polyethylene-2 and 6-naphthalate, polyolefin such as polyethylene and polyprophylene, cellulose derivatives such as cellulose acetate, polyimide, polyamide, and polyamideimide. Furthermore, a metal foil such as aluminum foil and paper can be also used.

In order to improve an adhesion between this non-magnetic support and the backing layer, there may be performed, e.g., corona discharge, and a surface treatment such as coating a surface modifier like an amine aqueous solution, trichloroacetic acid and phenol.

The backing layer is formed having a dry thickness of 0.1–2.0 μm and preferably 0.5–1.5 μm on the non-magnetic support body.

According to the present invention, a coated magnetic layer composed of at least ferromagnetic metal powders and binding agent resin is formed on the surface, opposite to the backing layer, of the non-magnetic support.

According to the present invention, as the ferromagnetic metal powders, there may be employed metal powders of Fe, Ni, Co, Fe—Ni alloy, Fe—Co alloy, Co—Ni alloy and Co—Cr alloy. The ferromagnetic metal magnetic powders having a specific surface area of 50 m²/g or above and a coercive force of 1500 [Oe] or over, are excellent in terms of an magneto-electro transduction characteristic as well as being preferable.

Added to the magnetic layer are binding agent, and, as the necessity arises, carbon black, curing agent, non-magnetic powder except carbon black, abrasive, lubricant and dispersant. The hitherto used known additives as explained with respect to the backing layer, are each usable.

The above-described known solvents and devices are usable as the solvents and dispersing and coating devices for use.

A magnetic field orientation of the magnetic layer may involve the use of the known techniques. Further, the calender treatment for smoothing the surface of the magnetic layer can be executed by the conventional method.

On the magnetic layer, it is preferable that Rq is 20 nm or under in order to obtain the good magneto-electric transduction characteristic. The present invention exhibits a larger effect as the surface of the magnetic layer becomes smoother and an excellent effect especially when Rq of the magnetic layer is 10 nm or under.

It is preferable that the dry thickness of the magnetic layer is 0.1–1.5 $\mu$m. The present invention is effective particularly in the case of the magnetic layer having a thickness of 0.3 $\mu$m or less and capable of a high-density record.

According to the present invention, an intermediate layer for enhancing the durability may be interposed between the magnetic layer and the non-magnetic support. Further, the magnetic layer may take a multi-layered structure to improve the magneto-electric transduction characteristic thereof.

Next, the present invention will be specifically described by way of examples but is not limited to these examples.

To start with, the following magnetic paint compositions are well mixed and dispersed for 72 hours by using the ball mill, and thereafter 5 parts by weight of polyisocyanate (Coronate L made by Nippon Polyurethane Co., Ltd.) is added thereto. The magnetic paint compositions are further uniformly mixed and dispersed for one hour, thus preparing magnetic paint.

This magnetic paint is filtered by a filter having an average hole diameter of 2 $\mu$m and thereafter coated over one-sided surface of a polyester film having a thickness of 6 $\mu$m so that a coating thickness after being dried becomes 1 $\mu$m. Then, after executing calender processing, the paint is hardened by heating at 60° C.

| [Magnetic Paint Composition] | |
|---|---|
| Fe powder<br>Coercive force 1535 [Oe]<br>Specific surface area 55 m²/g | 100 parts by weight |
| —SO₃M group contained vinyl chloride-acrylic copolymer (MR110 made by Nippon Zeon Co., Ltd.) | 12 parts by weight |
| —SO₃M group contained polyurethane (UR8700 made by Toyobo Co./Ltd.) | 12 parts by weight |
| Lecithin | 2 parts by weight |
| Alumina<br>Average particle size 0.2 $\mu$m | 5 parts by weight |
| Carbon black<br>Average particle size 0.03 $\mu$m | 8 parts by weight |

| -continued | |
|---|---|
| [Magnetic Paint Composition] | |
| Butyl stearate | 3 parts by weight |
| Stearic acid | 2 parts by weight |
| Methyl ethyl ketone | 195 parts by weight |
| Cyclohexane | 195 parts by weight |

Next, the backing layer paint compositions containing the following carbon black A or B are well mixed and dispersed for 48 hours by using the ball mill, and thereafter 5 parts by weight of polyisocyanate (Coronate L made by Nippon Polyurethane Co., Ltd.) is added thereto. The magnetic paint compositions are further uniformly mixed and dispersed for one hour, thus preparing backing paint.

| [Backing Layer Paint Composition] | |
|---|---|
| Carbon black<br>Carbon black A<br>Average particle size 101 nm<br>Oil absorption 65 ml (DBP)/100 g<br>Carbon black B<br>Average particle size 38 nm<br>Oil absorption 500 ml (DBP)/100 g | 100 parts by weight |
| Polyurethane resin<br>(N-2304 made by Nippon Polyurethane Co., Ltd.) | 45 parts by weight |
| Nitrocellulose<br>(BTH-1/2 made by Asahi Chemical Industry Co., Ltd.) | 45 parts by weight |
| Lecithin | 2 parts by weight |
| Alumina<br>Average particle size 0.3 $\mu$m | 2 parts by weight |
| Butyl stearate | 2 parts by weight |
| Stearic acid | 2 parts by weight |
| Methyl ethyl ketone | 400 parts by weight |
| Cyclohexane | 400 parts by weight |

This backing layer paint is filtered by the filter having an average hole diameter of 10 $\mu$m and thereafter coated over the underside surface of the polyester film of which one-sided surface is formed with the magnetic layer so that a thickness after being dried becomes 1 $\mu$m. Thereafter, a calender treatment is executed by a 5-stage calender at a speed of 30 m/min. Metal rolls and hard urethane elastic rolls are employed as calender rolls, and a process temperature and a linear pressure are given as shown in Table-1. The magnetic recording medium formed with the thus structured backing layer is slit to a width of ¼ in, thus manufacturing a magnetic tape.

Surface characteristics are measured by a three-dimensional non-contact surface roughness meter "New View 100 (made by ZYGO Corp.), thereby obtaining Rq and Rsk.

Further, the above-described magnetic tape is arranged in a 5-in QIC cartridge, and a winging characteristic, an error and a durability are evaluated. Results thereof are shown in Table-1.

The winding characteristic is evaluated in such a way that the tape is run times in reciprocation by a magnetic tape drive (Jumbo 700 made by Cororado Memory Systems Corp.), and a winding shape after being run is visually judged based on the following criteria. Note that the running speed is 90 ips (approximately 2.3 m/sec).

| | |
|---|---|
| No winding swell after being run up to 10 volumes | O |
| Winding swells occur in 1–3 volumes after being run up to 10 volumes | Δ |
| Winding swells occur in 4 or more volumes after being run up to 10 volumes | x |

The error is evaluated by recording and reproducing a predetermined piece of data on and from the magnetic tape and comparing the reproduced data with the input data. A recording frequency is 76300 ftpi. Note that an error value for a running time of zero hour by the magnetic tape drive is set as an initial error value.

The magnetic recording medium according to the present invention has capabilities of both of the excellent running characteristic and of making the print-through hard to occur, and is highly useful as a magnetic recording medium for performing the high-density record, wherein the winding deviation is hard to happen, the occurrence of error is restrained, and the running speed is high.

It is apparent that, in this invention, a wide range of different working modes can be formed based on the invention without deviating from the spirit and scope of the invention. This invention is not restricted by its specific working modes except being limited by the appended claims.

What is claimed is:

1. A magnetic recording medium in a tape shape, for recording/reproducing at a running speed 2 m/sec or higher, comprising:

a non-magnetic support;

a magnetic layer formed on one surface of said non-magnetic support and containing at least ferromagnetic metal powders and binding agent resin; and a backing layer formed on an opposite surface of said non-magnetic support and containing at least carbon black and binding agent resin, wherein a three-dimensional root mean square value roughness Rq, defined by the following formula [1], of the surface of said backing layer is 200 nm or above and 280 nm or under, and a three-dimensional distortion degree Rsk, defined by the following formula [2], of the surface thereof is −0.2 or under:

$$Rq = \left[\frac{1}{S}\int\{f(x,y)\}^2 ds\right]^{1/2} \qquad \text{Formula[1]}$$

$$Rsk = \frac{S^{1/2} \cdot \int\{f(x,y)\}^3 ds}{[\int\{f(x,y)\}^2 ds]^{3/2}} \qquad \text{Formula[2]}$$

where f(x, y) is a roughness profile expressed by nm unit when an X-Y plane is a roughness mean surface, a recessed portion is negative and a protruded portion is positive, and S represents an area of a roughness measurement area on the X-Y plane.

2. A magnetic recording medium according to claim 1, wherein said ferromagnetic metal powders have a specific surface area of 50 m²/g or larger and a coercive force of 1500 [Oe] or above.

3. A method of manufacturing the tape-shaped magnetic recording medium of claim 1, said method comprising:

a step of applying a calendar treatment to said backing layer at a temperature below the glass transition point Tg of said backing layer and at a linear pressure of 50 through 400 kg/cm.

* * * * *